(12) United States Patent
Ikonin et al.

(10) Patent No.: US 10,848,784 B2
(45) Date of Patent: *Nov. 24, 2020

(54) APPARATUS AND METHOD FOR VIDEO MOTION COMPENSATION

(71) Applicant: Huawei Technologies Co., Ltd., Shenzhen (CN)

(72) Inventors: Sergey Yurievich Ikonin, Moscow (RU); Maxim Borisovitch Sychev, Moscow (RU); Victor Alexeevich Stepin, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

This patent is subject to a terminal disclaimer.

(21) Appl. No.: 15/934,546

(22) Filed: Mar. 23, 2018

(65) Prior Publication Data

US 2018/0213261 A1  Jul. 26, 2018

Related U.S. Application Data

(63) Continuation of application No. PCT/RU2015/000613, filed on Sep. 25, 2015.

(51) Int. Cl.
*H04N 19/82* (2014.01)
*H04N 19/50* (2014.01)
(Continued)

(52) U.S. Cl.
CPC ............ *H04N 19/82* (2014.11); *G06T 5/003* (2013.01); *H04N 19/117* (2014.11);
(Continued)

(58) Field of Classification Search
None
See application file for complete search history.

(56) References Cited

U.S. PATENT DOCUMENTS 6,175,656 B1  1/2001 Hoang
7,266,150 B2  9/2007 Demos
(Continued)

FOREIGN PATENT DOCUMENTS

CN  1663258 A  8/2005
CN  103238320 A  8/2013
(Continued)

OTHER PUBLICATIONS

Maxim et al., "SCE3: Inter-layer prediction modes based on base layer sharpness filter," Joint Collaborative Team on Video Coding (JCT-VC) of ITU-T SG 16 WP 3 and ISO/IEC JTC 1/SC 29/WG 11, Document: JCTVC-O0163, pp. 1-7, International Union of Telecommunication—Geneva, Switzerland (Oct. 23-Nov. 1, 2013).

(Continued)

*Primary Examiner* — Dakshesh D Parikh
(74) *Attorney, Agent, or Firm* — Leydig, Voit & Mayer, Ltd.

(57) ABSTRACT

A video coder for predictive coding a video stream of subsequent frames according to motion compensation into an encoded video bit stream is provided. The video coder comprises a frame buffer adapted to store at least one reference frame of the video stream, the at least one reference frame being different from a current frame of the video stream, an inter predictor adapted to generate a prediction block of a current block of the current frame from a reference block of the reference frame, and a sharpening filter adapted to filter the prediction block.

17 Claims, 3 Drawing Sheets

(51) Int. Cl.

| | | |
|---|---|---|
| *H04N 19/523* | (2014.01) | |
| *H04N 19/117* | (2014.01) | |
| *H04N 19/176* | (2014.01) | |
| *H04N 19/44* | (2014.01) | |
| *H04N 19/51* | (2014.01) | |
| *G06T 5/00* | (2006.01) | |

(52) U.S. Cl.
CPC ........... *H04N 19/176* (2014.11); *H04N 19/44* (2014.11); *H04N 19/50* (2014.11); *H04N 19/51* (2014.11); *H04N 19/523* (2014.11); *G06T 2207/20201* (2013.01)

(56) References Cited

U.S. PATENT DOCUMENTS

| | | | |
|---|---|---|---|
| 8,705,622 | B2 | 4/2014 | Ye et al. |
| 8,780,971 | B1 | 7/2014 | Bankoski et al. |
| 2002/0063807 | A1 | 5/2002 | Margulis |
| 2003/0194010 | A1 | 10/2003 | Mukerjee et al. |
| 2004/0213470 | A1 | 10/2004 | Sato et al. |
| 2005/0147316 | A1 | 7/2005 | Deshpande et al. |
| 2005/0243913 | A1 | 11/2005 | Kwon et al. |
| 2007/0091997 | A1 | 4/2007 | Fogg et al. |
| 2008/0089417 | A1 | 4/2008 | Bao et al. |
| 2008/0109041 | A1 | 5/2008 | De Voir |
| 2008/0205508 | A1 | 8/2008 | Ziauddin et al. |
| 2009/0257499 | A1 | 10/2009 | Karczewicz et al. |
| 2010/0002770 | A1 | 1/2010 | Motta et al. |
| 2010/0008430 | A1 | 1/2010 | Karczewicz et al. |
| 2010/0053689 | A1 | 3/2010 | Ohwaku et al. |
| 2010/0111182 | A1 | 5/2010 | Karczewicz et al. |
| 2010/0128995 | A1* | 5/2010 | Drugeon .............. H04N 19/176 382/238 |
| 2010/0284458 | A1 | 11/2010 | Andersson et al. |
| 2011/0096236 | A1 | 4/2011 | Ngan et al. |
| 2011/0299604 | A1 | 12/2011 | Price et al. |
| 2011/0317764 | A1 | 12/2011 | Joshi et al. |
| 2012/0170650 | A1 | 7/2012 | Chong et al. |
| 2012/0200669 | A1 | 8/2012 | Lai et al. |
| 2012/0307900 | A1 | 12/2012 | Demos |
| 2013/0003845 | A1 | 1/2013 | Zhou et al. |
| 2013/0034165 | A1* | 2/2013 | Sasai .................... H04N 19/176 375/240.16 |
| 2013/0070858 | A1 | 3/2013 | Demos |
| 2013/0077697 | A1 | 3/2013 | Chen et al. |
| 2013/0182780 | A1 | 7/2013 | Alshin et al. |
| 2013/0215974 | A1 | 8/2013 | Chong et al. |
| 2014/0044161 | A1 | 2/2014 | Chen et al. |
| 2014/0072048 | A1 | 3/2014 | Ma et al. |
| 2014/0133546 | A1 | 5/2014 | Bandoh et al. |
| 2014/0192862 | A1 | 7/2014 | Flynn et al. |
| 2014/0192865 | A1 | 7/2014 | Zhang et al. |
| 2014/0254680 | A1 | 9/2014 | Ho et al. |
| 2015/0078448 | A1 | 3/2015 | Puri et al. |
| 2015/0116539 | A1 | 4/2015 | Nayar et al. |
| 2015/0124864 | A1 | 5/2015 | Kim et al. |
| 2015/0237358 | A1 | 8/2015 | Alshin et al. |
| 2016/0014411 | A1* | 1/2016 | Sychev ................. H04N 19/56 375/240.12 |
| 2016/0105685 | A1* | 4/2016 | Zou ...................... H04N 19/117 375/240.12 |
| 2018/0048910 | A1 | 2/2018 | Kalevo et al. |
| 2019/0215515 | A1 | 7/2019 | Sychev |

FOREIGN PATENT DOCUMENTS

| | | |
|---|---|---|
| CN | 103650509 A | 3/2014 |
| CN | 104937941 A | 9/2015 |
| EP | 1841230 A1 | 10/2007 |
| EP | 2111719 B1 | 8/2014 |
| EP | 2819413 A1 | 12/2014 |
| EP | 2860980 A1 | 4/2015 |
| JP | 2001057677 A | 2/2001 |
| JP | 2003333604 A | 11/2003 |
| JP | 2004007337 A | 1/2004 |
| JP | 2006067213 A | 3/2006 |
| JP | 2006513592 A | 4/2006 |
| JP | 2008054267 A | 3/2008 |
| JP | 2010507286 A | 3/2010 |
| JP | 2010110004 A | 5/2010 |
| JP | 2011527553 A | 10/2011 |
| JP | 2013542666 A | 11/2013 |
| JP | 2014504098 A | 2/2014 |
| JP | 2015165726 A | 9/2015 |
| RU | 2358410 C2 | 6/2009 |
| RU | 2008106939 A | 8/2009 |
| RU | 2521081 C2 | 6/2014 |
| TW | 201528777 A | 7/2015 |
| WO | 2012109528 A1 | 8/2012 |
| WO | 2013055876 A | 4/2013 |
| WO | 2013147495 A1 | 10/2013 |
| WO | 2014158050 A1 | 10/2014 |

OTHER PUBLICATIONS

Yoon et al., "Adaptive filtering for prediction signal in video compression", 2011 IEEE International Conference on Consumer Electronics—Berlin, Institute of Electrical and Electronics Engineers, New York, New York, XP031968553, (Sep. 2011).

Sychev et al, "Sharpening filter for interlayer prediction", 2014 IEEE Visual Communications and Image Processing Conference, IEEE, XP032741195, Institute of Electrical and Electronics Engineers, New York, New York, (Dec. 2014).

Sychev et al, "Inter-layer prediction modes based on base layer sharpness filter," Joint Collaborative Team on Video Coding (JCT-VC) of ITU-T SG16 WP3 and ISO/IEC JTC 1/SC 29/WG 11, JCTVC-N0070, International Telecommunications Union, Geneva, Switzerland (Jul. 25-Aug. 2, 2013).

"Series H: Audiovisual and Multimedia Systems Infrastructure of audiovisual services—Coding of moving video Advanced video coding for generic audiovisual services," ITU-T H.264, Telecommunication Standardization Sector of ITU, International Telecommunications Union, Geneva Switzerland, (Feb. 2014).

"Line Transmission of Non-Telephone Signals Video Codec for Audiovisual Services AT px64 kbits," ITU-T H.261 Telecommunication Standardization Sector of ITU, International Telecommunications Union, Geneva Switzerland, (Mar. 1993).

"Series H: Audiovisual and Multimedia Systems Infrastructure of audiovisual services—Coding of moving video Video coding for low bit rate communication," ITU-T H.263, Telecommunication Standardization Sector of ITU, International Telecommunications Union, Geneva Switzerland, (Jan. 2005).

"Series H: Audiovisual and Multimedia Systems Infrastructure of audiovisual services—Coding of moving video High efficiency video coding," ITU-T H.265, Telecommunication Standardization Sector of ITU, International Telecommunications Union, Geneva Switzerland, (Apr. 2015).

Arad et al., "Enhancement by Image-Dependent Warping," IEEE Transactions on Image Processing, vol. 8, No. 8, Institute of Electrical and Electronic Engineers, New York, New York (Aug. 1999).

Prades-Nebot et al., "Image enhancement using warping technique," Electronics Letters, vol. 39 No. 1, Institute of Electrical and Electronic Engineers, New York, New York (2003).

Yoon et al., "Adaptive Prediction Block Filter for Video Coding," ETRI Journal, vol. 34, No. 1, (Feb. 2012).

Lu et al., "CE6.H related: Results on Modified Binarization for Region Boundary Chain Coding," Joint Collaborative Team on 3D Video Coding Extensions of ITU-T SG 16 WP 3 and ISO/IEC JTC 1/SC 29/WG 11, 4th Meeting, Incheon, KR, JCT3V-D0077, pp. 1-6, International Telecommunication Union, Geneva, Switzerland (Apr. 20-26, 2013).

Ma et al., "SCE4: Switchable De-ringing Filter for Inter-layer Prediction," Joint Collaborative Team on Video Coding (JCT-VC) of ITU-T SG 16 WP 3 AND ISO/IEC JTC 1/SC 29/WG 11 13th Meeting, Incheon, KR, JCTVC-M0055, pp. 1-4, International Telecommunication Union, Geneva, Switzerland (Apr. 18-26, 2013).

(56) References Cited

OTHER PUBLICATIONS

Laude et al., "Motion Blur Compensation in Scalable HEVC Hybrid Video Coding," 2013 IEEE, pp. 1-4, Institute of Electrical and Electronics Engineers, New York, New York (2013).
Ma et al., "De-Ringing Filter for Scalable Video Coding," 2013 IEEE International Conference on Multimedia and Expo Norkshops (ICMEW), pp. 1-4, Institute of Electrical and Electronics Engineers, New York, New York (Jul. 2013).
Helle et al., "A Scalable Video Coding Extension of HEVC," 2013 Data Compression Conference, Institute of Electrical and Electronics Engineers, New York, New York (Mar. 2013).
Alshina et al., "Inter-layer Filtering for Scalable Extension of HEVC," 2013 IEEE, PCS 2013, Institute of Electrical and Electronics Engineers, New York New York (2013).
Wedi, "Adaptive Interpolation Filter for Motion Compensated Prediction," IEEE ICIP 2002, pp. 509-512, Institute of Electrical and Electronics Engineers, New York, New York, (2002).
Vatis et al., "Motion- and Aliasing-Compensated Prediction Using a Two-Dimensional Non-Separable Adaptive Wiener Interpolation Filter," pp. 1-4, Institute of Electrical and Electronics Engineers, New York, New York, (2005).
Rusanovskyy et al.,"Video Coding With Low-Complexity Directional Adaptive Interpolation Filters," IEEE Transactions on Circuits and Systems for Video Technology, vol. 19, No. 8, pp. 1239-1243, Institute of Electrical and Electronics Engineers, New York, New York (Aug. 2009).
Dong et al., "Parametric Interpolation Filter for HD Video Coding," IEEE Transactions on Circuits and Systems for Video Technology, vol. 20, No. 12, pp. 1892-1897, Institute of Electrical and Electronics Engineers, New York,New York, (Dec. 2010).
Matsuo et al.,"Enhanced Region-Based Adaptive Interpolation Filter," 28th Picture Coding Symposium, PCS2010, Nagoya, Japan, pp. 526-529, Institute of Electrical and Electronics Engineers, New York, New York (Dec. 8-10, 2010).
MURAKAMI et al., "High efficiency video coding technology HEVC / H.265 and its application," Abstract, Ohm Company, Nakagawa, Japan (2013).

Sajjad et al., "Digital image super-resolution using adaptive interpolation based on Gaussian function," Multimedia Tools and Applications, vol. 74, No. 20, XP035547508, pp. 8961-8977, Kluwer Academics Publishers, Boston, USA (Jul. 9, 2013).
Turkowski, "Filters for Common Resampling Tasks," XP002592040, pp. 1-14 (Apr. 10, 1990).
Masaru et al., "TE12.2: Results on MC interpolation filters," Joint Collaborative Team on Video Coding (JCT-VC) of ITU-T SG16 WP3 and ISO/IEC JTC1/SC29/WG11, 3rd Meeting, Guangzhou, China, JCTVC-C162, pp. 1-26, International Telecommunication Union, Geneva, Switzerland (Oct. 7-14, 2010).
Ugur et al., "Motion Compensated Prediction and Interpolation Filter Design in H.265/HEVC," IEEE Journal of Selected Topics in Signal Processing, vol. 7, No. 6, pp. 946-956, Institute of Electrical and Electronics Engineers, New York, New York (Dec. 2013).
Liu et al., "Motion Blur Compensation in HEVC Using Fixed-Length Adaptive Filter," IEEE Picture Coding Symposium (PCS), pp. 30-34, Institute of Electrical and Electronics Engineers, New York, New York (2015).
Liu, "Unified Loop Filter for Video Compression," IEEE Transactions on Circuits and Systems for Video Technology, vol. 20, No. 10, pp. 1378-1382, Institute of Electrical and Electronics Engineers, New York, New York (Oct. 2010).
Tsai et al., "Adaptive Loop Filtering for Video Coding," IEEE Journal of Selected Topics in Signal Processing, vol. 7, No. 6, pp. 934-945, Institute of Electrical and Electronics Engineers, New York, New York (Dec. 2013).
Chiu et al., "Adaptive (Wiener) Filter for Video Compression," ITU-T Study Group 16-ConIribulion 437, Document VCEG-AI14, COM 16-C 437 R1-E, pp. 1-7, International Telecommunication Union, Geneva, Switzerland (Apr. 2008).
Zhang, "Video Image Enhancement Technology Based on Real-time Processing of FPGA," With English Abstract, North University of China, pp. 1-71, North University of China, Tayuan, China (May 2011).

* cited by examiner

APPARATUS AND METHOD FOR VIDEO MOTION COMPENSATION

CROSS-REFERENCE TO RELATED APPLICATIONS

This application is a continuation of International Application No. PCT/RU2015/000613, filed on Sep. 25, 2015, the disclosure of which is hereby incorporated by reference in its entirety.

TECHNICAL FIELD

Embodiments of the present disclosure generally relate to the field of video processing and to an apparatus for video motion compensation, and relates to a video coder and to a video decoder for supporting motion compensation to predict frames in a video. The present disclosure relates further to a method for coding and to a method for decoding a video stream using motion compensation. Finally, the present disclosure relates to a computer program having a program code for performing such a method.

BACKGROUND

In the field of video processing, and in particular in the field of hybrid video coding and compression, it is known to use inter and intra prediction as well as transform coding. Such hybrid video coding technologies are used in known video compression standards like H.261, H.263, MPEG-1, 2, 4, H.264/AVC or H.265/HEVC.

FIG. 1 shows a video coder according to the state of the art. The video coder 100 comprises an input for receiving input blocks of frames or pictures of a video stream and an output for generating an encoded video bit stream. The video coder 100 is adapted to apply prediction, transformation, quantization, and entropy coding to the video stream. The transformation, quantization, and entropy coding are carried out respectively by a transform unit 101, a quantization unit 102 and an entropy encoding unit 103 so as to generate as an output the encoded video bit stream.

The video stream corresponds to a plurality of frames, wherein each frame is divided into blocks of a certain size that are either intra or inter coded. The blocks of for example the first frame of the video stream are intra coded by means of an intra prediction unit 109. An intra frame is coded using only the information within the same frame, so that it can be independently decoded and it can provide an entry point in the bit stream for random access. Blocks of other frames of the video stream are inter coded by means of an inter prediction unit 110: information from coded frames, which are called reference frames, are used to reduce the temporal redundancy, so that each block of an inter coded frame is predicted from a block of the same size in a reference frame. A mode selection unit 108 is adapted to select whether a block of a frame is to be processed by the intra prediction unit 109 or the inter prediction unit 110.

For performing inter prediction, the coded reference frames are processed by an inverse quantization unit 104, an inverse transform unit 105, a loop filtering unit 106 so as to obtain the reference frames that are then stored in a frame buffer 107. Particularly, reference blocks of the reference frame can be processed by these units to obtain reconstructed reference blocks. The reconstructed reference blocks are then recombined into the reference frame.

The inter prediction unit 110 comprises as input a current frame or picture to be inter coded and one or several reference frames or pictures from the frame buffer 107. Motion estimation and motion compensation are applied by the inter prediction unit 110. The motion estimation is used to obtain a motion vector and a reference frame based on certain cost function. The motion compensation then describes a current block of the current frame in terms of the transformation of a reference block of the reference frame to the current frame. The inter prediction unit 110 outputs a prediction block for the current block, wherein said prediction block minimizes the difference between the current block to be coded and its prediction block, i.e. minimizes the residual block. The minimization of the residual block is based e.g. on a rate-distortion optimization procedure.

The difference between the current block and its prediction, i.e. the residual block, is then transformed by the transform unit 101. The transform coefficients are quantized and entropy coded by the quantization unit 102 and the entropy encoding unit 103. The thus generated encoded video bit stream comprises intra coded blocks and inter coded blocks.

Such a hybrid video coding comprises motion-compensated prediction combined with transform coding of the prediction error. For each block, the estimated motion vector is also transmitted as signaling data in the encoded video bit stream. Today's standards H.264/AVC and H.265/HEVC are based on ¼ pel displacement resolution for the motion vector. In order to estimate and compensate the fractional-pel displacements, the reference frame has to be interpolated on the fractional-pel positions. To obtain such an interpolated frame on the fractional-pel positions, an interpolation filter is used in the inter prediction unit 110.

The quality of the interpolated frame strongly depends on the properties of the used interpolation filter. Short-tap filters, e.g. bilinear filters, may suppress high frequencies and render the interpolated frame blurred. Other filters like long-tap filters may preserve high frequencies but generate some ringing artifacts in the neighborhood of sharp edges. Another problem is that the motion compensation makes use of a previously encoded and reconstructed frame as a reference frame: the reference frame may contain artifacts caused by quantization of transform coefficient, which is referred to as Gibbs effect. Because of these artifacts, the edges as well as the area around the edges may also be distorted.

It is known in the conventional art that the quality of the edges may be increased by applying a sharpening or de-blurring post-filter to the decoded frame. The problem of such post-filtering design is that the sharpening filter is not included in to encoding process. Thus the effect of the sharpening filter cannot be taken into account during the rate-distortion optimization procedure. This may lead to reduced objective quality metrics, like the peak signal-to-noise-ratio (PSNR).

To increase the objective quality, it is also known in the conventional art to include a sharpening filter into the loop filtering unit 106. Accordingly, the sharpening filter is applied to the reconstructed reference frame and may improve motion-compensated prediction by removing compression artifacts in the reference frame. However such a loop filtering technique cannot remove artifacts caused by the motion interpolation filter.

SUMMARY

Having recognized the above-mentioned disadvantages and problems, the implementations according to the present disclosure allow to improve the state of the art. For example, an object of the present disclosure is to provide a video coder, a coding method, a video decoder, and a decoding method for an improved coding and decoding of a video stream of subsequent frames.

Implementations of the present disclosure, for example, allow to improve the quality of the inter predictive coding. For example, implementations of the disclosure allow to remove artifacts caused by the motion compensation. For example, implementations of the present disclosure allow to reduce negative effects of the motion interpolation filter, i.e. to reduce negative effects of the interpolation of the reference frame on fractional-pel positions as well as improving quality of prediction by reducing quantization artefacts of reference frame.

Implementations of the present disclosure are defined in the enclosed independent claims. Additional implementations of the present disclosure are further defined in the respective dependent claims.

A first aspect of the present disclosure provides a video coder for predictive coding a video stream of subsequent frames according to motion compensation into an encoded video bit stream. The video coder comprises a frame buffer adapted to store at least one reference frame of the video stream, said reference frame being different from a current frame of the video stream. The video coder comprises an inter prediction unit adapted to generate a prediction block of a current block of the current frame from a reference block of the reference frame. The video coder comprises a sharpening filter adapted to filter the prediction block.

Thereby, applying the sharpening filter to the prediction block improves the quality of the inter predictive coding in that it removes or at least reduces the ringing artifacts caused by the interpolation of the reference frame/block on fractional-pel positions, i.e. caused by the motion interpolation filter, while advantageously keeping quality interpolated edges. It also removes or at least reduces the ringing artifacts, also referred to as Gibbs effect, caused by the quantization of transform coefficients in the reference block. It further on reduces the blurring of edges caused by the quantization and motion interpolation, and also reduces the blurring of edges caused by motion blur. Additionally, the present disclosure increases the subjective quality of edges in the reconstructed frame/block.

Thereby, the placement of the sharpening filter according to the disclosure after the motion interpolation filter, i.e. after the inter prediction unit, causes the sharpening filter to carry out the task of the in-loop reference filters, i.e. of the loop filtering unit, while at the same time the artifacts caused by motion interpolation filtering can be removed or at least reduced.

In a first implementation form of the video coder according to the first aspect, the sharpening filter is a non-linear filter.

Thereby, that usage of such a non-linear sharpening filter is preferable for motion prediction enhancement. Traditional edge enhancement techniques based on linear sharpening or de-blurring filters, like unsharp masking techniques, may increase subjective quality but cannot suppress the ringing artifacts caused by motion interpolation filtering. It has also been discovered that in most cases, such linear sharpening even may increase ringing and reduce the objective performance characteristics. On the other, non-linear filters can provide better results for ringing elimination and are thus advantageous.

In a further implementation form of the video coder according to the first aspect, the sharpening filter comprises an edge map calculation unit adapted to generate an edge map of a source block, said source block being the reference block or the prediction block. The sharpening filter comprises a blurring filter adapted to blur the edge map of the source block. The sharpening filter comprises a high-pass filter adapted to generate, by high-pass filtering the blurred edge map, a derivative vector for each position of the source block. The sharpening filter comprises a scaling unit adapted to generate a displacement vector by scaling the derivative vector with a sharpening strength coefficient. The sharpening filter comprises a warping unit adapted to warp the prediction block based on the displacement vector.

Thereby, this structure of the sharpening filter defines a non-linear sharpening filter that advantageously can provide better results in terms of elimination of ringing artifacts.

In a further implementation form of the video coder according to the first aspect, the edge map calculation unit comprises a gradient vector unit adapted to generate a gradient vector for each position of the source block. The edge map calculation unit comprises a gradient vector length unit adapted to calculate the length of the gradient vector of each position so as to generate the edge map of the source block.

Thereby, this structure allows for the generation of an edge map that can be further processed by the blurring filter, the high-pass filter and the scaling unit to generate the displacement vector.

In a further implementation form of the video coder according to the first aspect, the gradient vector unit is a Prewitt filter.

Thereby, the use of a Prewitt filter is advantageous in that it can output a gradient vector for each position of the source block in order to generate the displacement vector and to warp the prediction block.

In a further implementation form of the video coder according to the first aspect, the sharpening filter comprises a clipping unit adapted to clip the edge map of the source block. The clipping unit is located between the edge map calculation unit and the blurring filter.

Thereby, the clipping of the edge map with thresholds is advantageous in that it prevents the processing of extremely high and low values of displacement vectors. Accordingly, the computational resources may be saved by excluding zero valued displacement from further warping processing.

In a further implementation form of the video coder according to the first aspect, the blurring filter is a Gaussian filter.

Thereby, the quality of the processing by the high-pass filter located after the Gaussian filter can be improved, so that also the warping based on the displacement vector can be improved.

In a further implementation form of the video coder according to the first aspect, the warping unit includes a bi-linear interpolation filter to obtain sample values at fractional positions.

Thereby, the overall quality of the video coder is improved while at the same time providing an interpolation of the reference frame/block on desired fractional-pel positions.

In a further implementation form of the video coder according to the first aspect, the source block is the reference block, such that the warping displacement vectors are derived from the reference block.

Thereby, the reference block is used as source block for obtaining the displacement vectors, which are also called sharpening displacement vectors or warping displacement vectors. The warping is then applied to the prediction block using the obtained warping displacement vector. This embodiment is advantageous in that is saves computational resources on the encoder side.

In a further implementation form of the video coder according to the first aspect, the source block is the prediction block, such that the warping displacement vectors are derived from the prediction block.

Thereby, choosing the prediction block as source block allows for the calculation of suitable displacement vectors for carrying out the warping of the prediction block. Also, the sharpening filter then only requires one input for the prediction block and a second input for the reference block is not needed.

In a further implementation form of the video coder according to the first aspect, the sharpening filter is always enabled.

In a further implementation form of the video coder according to the first aspect, the video coder comprises a control unit adapted to control at least one of a selective bypass of the sharpening filter and a selective application of the sharpening filter.

Thereby, a decision can be taken by the control unit to enable or disable the sharpening filter. The decision can then be adapted to each particular case, for example to the particular video stream to be encoded. Also, the sharpening filter can be bypassed to save computational resources in the video coder. On the other hand, the sharpening filter can be applied if the priority shall be given to the improvement of the interpolation quality and the reduction of artifacts.

In a further implementation form of the video coder according to the first aspect, the control unit is adapted to control the at least one of the selective bypass and the selective application of the sharpening filter depending on a cost function to minimize a residual block. Said residual block is the difference between the current block and the prediction block. The cost function may be, for example, based on the rate distortion optimization.

Thereby, the possibility of applying or bypassing the sharpening filter can be further used to improve the motion compensation. The two residual blocks derived respectively from the prediction block outputted by the inter prediction unit and from the prediction block outputted by the sharpening filter can be compared in terms of the cost function. By choosing the prediction block that minimized the residual block and by correspondingly applying or bypassing the sharpening filter, the quantity of data and, for example, the quantity of transform coefficients to be encoded can be reduced.

In a further implementation form of the video coder according to the first aspect, the video coder comprises an encoding unit adapted to generate the encoded video bit stream. The control unit is adapted to transmit to the encoding unit sharpening filter information reflecting the at least one of the selective bypass and the selective application of the sharpening filter. The encoding unit is adapted to add the sharpening filter information in the encoded video bit stream.

Thereby, when decoding the encoded video bit stream, it is possible to obtain this sharpening filter information and to accordingly apply or bypass the sharpening filter on the decoder side, so as to guarantee a correct decoding.

In a further implementation form of the video coder according to the first aspect, the sharpening filter information is added at a block level for each prediction block, for an arbitrary or regular region of the frame, at a frame level, at a GOP (group of pictures) level, at a PPS (picture parameter set) level or at an SPS (sequence parameter set) level.

Thereby, it is possible to set the sharpening filter information to a desired granularity so that the signaling can be optimized.

A second aspect of the present disclosure provides a method for predictive coding a video stream of subsequent frames according to motion compensation into an encoded video bit stream. The method comprises storing at least one reference frame of the video stream, said reference frame being different from a current frame of the video stream. The method comprises generating a prediction block of a current block of the current frame from a reference block of the reference frame. The method comprises applying a sharpening filter step to the prediction block.

Further features or implementations of the method according to the second aspect of the disclosure can perform the functionality of the video coder according to the first aspect of the disclosure and its different implementation forms.

A third aspect of the present disclosure provides a video decoder for decoding an encoded video bit stream obtained by predictive coding a video stream of subsequent frames according to motion compensation. The video decoder comprises a frame buffer adapted to store at least one reference frame obtained from the encoded video bit stream, said reference frame being different from a current frame of the encoded video bit stream. The video decoder comprises an inter prediction unit adapted to generate a prediction block of a current block of the current frame from a reference block of the reference frame. The video decoder comprises a sharpening filter adapted to filter the prediction block.

Thereby, the advantages obtained with respect to the video coder according to the first aspect are also given with respect to the video decoder according to the third aspect.

In an implementation form of the video decoder according to the third aspect, the sharpening filter is always enabled.

In an implementation form of the video decoder according to the third aspect, the video decoder comprises a control unit adapted to control at least one of a selective bypass of the sharpening filter and a selective application of the sharpening filter.

Thereby, the decision to apply or bypass the sharpening filer unit can be adapted to each particular case. Also, the sharpening filter can be bypassed to save computational resources in the video coder and the video decoder. On the other hand, the sharpening filter can be applied if the priority shall be given to the improvement of the interpolation quality and the reduction of artifacts.

In an implementation form of the video decoder according to the third aspect, the control unit is adapted to control the at least one of the selective bypass and the selective application of the sharpening filter depending on sharpening filter information obtained from the encoded video bit stream.

Thereby, the video decoder can be adapted to the video coder that may advantageously add in the encoded video bit stream such sharpening filter information that reflects the at least one of the selective bypass and the selective application of the sharpening filter on the video coder side.

Further features or implementations of the video coder according to the first aspect of the disclosure, particularly regarding the sharpening filter and its structure, are also applicable to the video decoder according to the third aspect of the disclosure.

A fourth aspect of the present disclosure provides a method for decoding an encoded video bit stream obtained by predictive coding a video stream of subsequent frames according to motion compensation. The method comprises storing at least one reference frame obtained from the encoded video bit stream, said reference frame being different from a current frame of the encoded video bit stream. The method comprises generating a prediction block of a current block of the current frame from a reference block of the reference frame. The method comprises applying a sharpening filter step to the prediction block.

Further features or implementations of the method according to the fourth aspect of the disclosure can perform the functionality of the video decoder according to the third aspect of the disclosure and its different implementation forms.

A fifth aspect of the present disclosure provides a computer program having a program code for performing such a coding and/or decoding method when the computer program runs on a computing device.

The disclosure proposes a motion compensation improvement by applying a sharpening filter to the motion prediction signal i.e. to the prediction blocks. It is proposed to improve the motion compensation by reducing ringing artifacts and increasing the sharpness of edges in motion prediction blocks. It is proposed to apply the sharpening filter as a prediction filter placed both in the encoder and the decoder for motion compensation enhancement. A non-linear sharpening prediction filter can be used for motion compensation improvement.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings, in which.

DETAILED DESCRIPTION OF EMBODIMENTS

Figure 2:
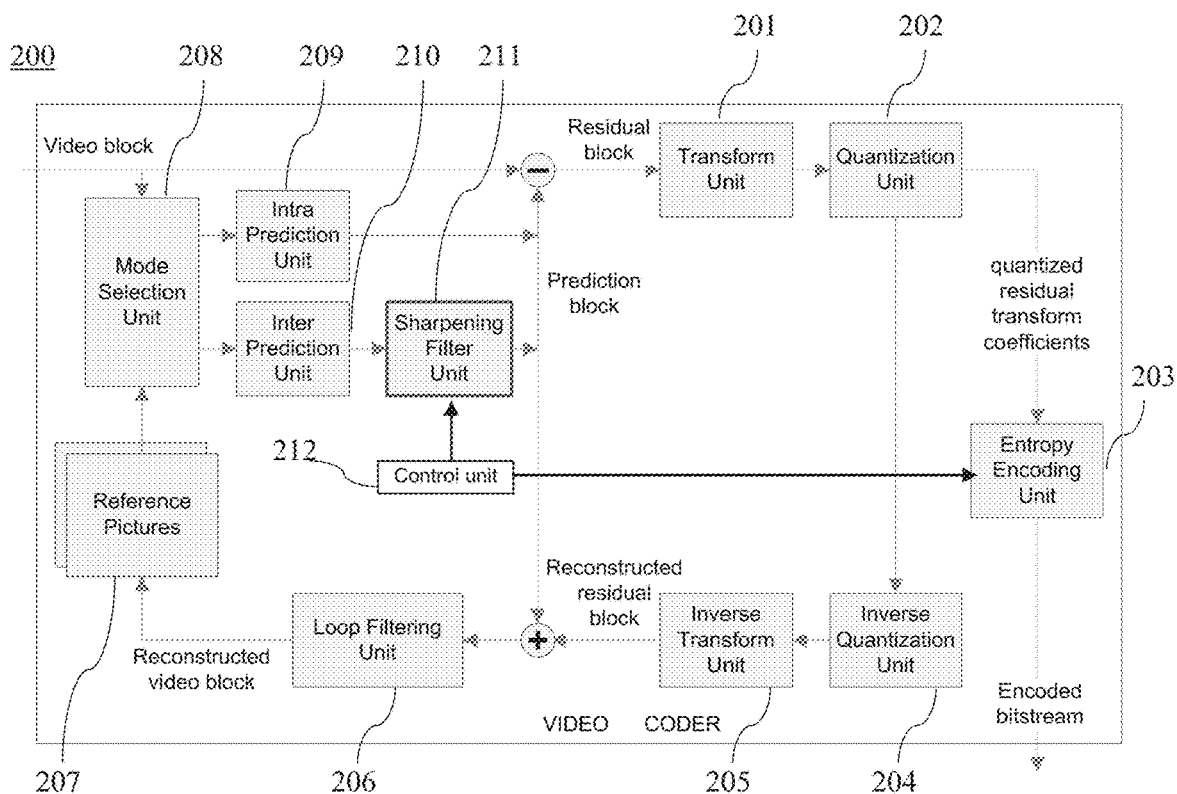
FIG. 2 shows a video coder according to an embodiment of the present disclosure.

FIG. 2 shows a video coder according to an embodiment of the present disclosure, and particularly a video coder 200 for predictive coding a video stream of subsequent frames according to motion compensation into an encoded video bit stream.

The video coder 200 comprises particularly a frame buffer 207, an inter prediction unit 210, and a sharpening filter 211.

The frame buffer 207 is adapted to store at least one reference frame or picture of the video stream. Said reference frame is different from a current frame of the video stream. Particularly and in the context of the disclosure, the current frame is a frame of the video stream that is currently encoded, while the reference frame is a frame of the video stream that has already been encoded. In the followings, any reference to the feature "frame" may be replaced by a reference to the feature "picture".

The inter prediction unit 210 is adapted to generate a prediction block of a current block of the current frame from a reference block of the reference frame. The reference frame is preferably the reference frame stored in the frame buffer 207, while the current block preferably corresponds to the input of the video coder 200 referred to as video block in FIG. 2. Particularly, the current frame is encoded using an inter coding technique, i.e. the current frame is predicted from the at least one reference frame that is distinct from the current frame. The reference frame can be a previous frame, i.e. a frame that is located prior to the current frame within the video stream of subsequent frames. Alternatively if forward prediction is used, the reference frame can be a future frame, i.e. a frame that is located after the current frame. In case of a plurality of reference frames, at least one can be such a previous frame and at least one of them can be such a future frame. A reference frame can be intra coded, i.e. can be coded without using any further frame and without any dependence on other frames, so that it can be independently decoded and it can serve as entry point for random video access.

Particularly, the inter prediction unit 210 is adapted to perform motion estimation by generating a motion vector and estimating motion between the reference block of the reference frame and the current block of the current frame. Said motion estimation is performed during encoding to find the motion vector pointing to the best reference block in the reference frame based on certain cost function being, for example, the rate-distortion optimization. Beside the motion estimation, the inter prediction unit 210 is further adapted to perform motion compensation by generating the prediction block for the current block on the basis of the motion vector and the reference block.

Particularly, the motion prediction comprises a motion estimation unit and a motion compensation unit. The motion vector is generated by using a motion estimation unit. The reference block and the current block are preferably a respective area or sub-area of the reference frame and the current frame. Such a block may have a regular shape, like e.g. a rectangular shape, or an irregular shape. Alternatively, the blocks can have the same size as the frames. Both the current block and the reference block have the same size. The size of the blocks can be defined by means of block mode information transmitted as side information or signaling data to the decoder. A block can correspond to a coding unit that is a basic coding structure of the video sequence of a pre-defined size, containing a part of a frame, e.g. 64×64 pixels.

The prediction block is generated for the current block in view of the reference block. Particularly, a plurality of prediction blocks can be generated for a plurality of current blocks of the current frame in view of a plurality of reference blocks. These reference blocks can be part of a single reference frame or can be selected from different reference frames. Several prediction blocks can be generated for the current frame, and the prediction blocks generated for the current frame can be combined to obtain a prediction frame of the current frame.

The sharpening filter 211 is adapted to filter the prediction block. The sharpening filter 211 is thus applied to the prediction block generated by the inter prediction unit 210. The sharpening filter 211 proposed by the disclosure is added after the inter prediction unit 210 so as to enhance the prediction block obtained by the inter prediction, i.e. obtained by the motion prediction comprising the motion estimation and the motion compensation. The sharpening filter 211 is thus adapted to generate a sharpened prediction block.

Figure 1:
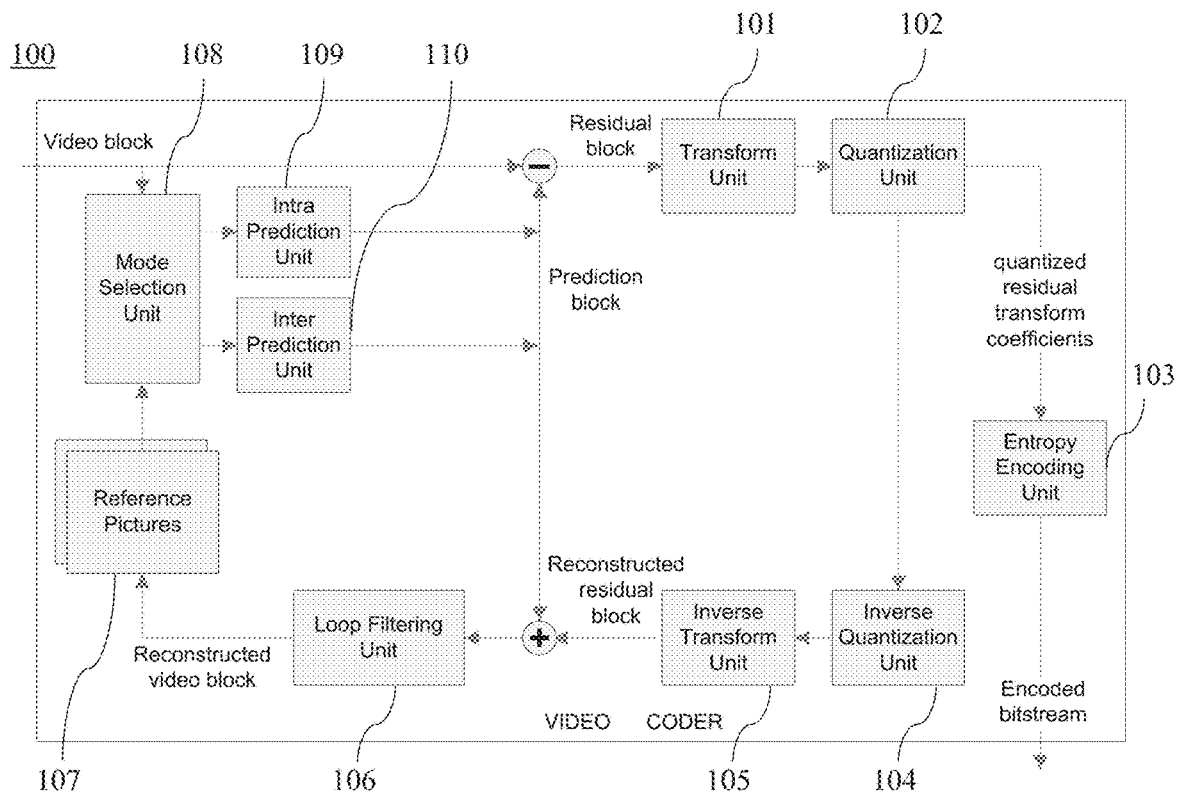
FIG. 1 shows a video coder according to the state of the art.

The video coder 200 of FIG. 2 comprises further units similar to the video coder 100 of FIG. 1 for particularly supporting hybrid video coding. For example, the video coder 200 comprises similar units that are a transform unit 201, a quantization unit 202 and an entropy encoder or entropy encoding unit 203 for, as already known in the art, generating transform coefficients via a transformation into the frequency domain, quantizing the coefficients and entropy coding the quantized coefficients for example together with signaling data. The input of the transform unit 201 is a residual block defined as being the difference between the current block of the current frame, referred to as video block in FIG. 2, and the prediction block outputted by the inter prediction unit 210, the sharpening filter 211 or an intra prediction unit 209. The entropy encoding unit 203 is adapted to generate as an output the encoded video bit stream.

The video coder 200 comprises further similar units that are an inverse quantization unit 204, an inverse transform unit 205 and a loop filtering unit 206. The quantized transform coefficients generated by the quantization unit 202 are inverse quantized and inverse transformed by respectively the inverse quantization unit 204 and inverse transform unit 205 to obtain a reconstructed residual block corresponding to the residual block fed to the transform unit 201. The reconstructed residual block is then added to the prediction block previously used for generating the residual block, so as to obtain a reconstructed current block corresponding to the current block, this reconstructed current block being referred to as reconstructed video block in FIG. 2. The reconstructed current block may be processed by the loop filtering unit 206 to smooth out artifacts that are introduced by the block-wise processing and quantization. The current frame, which comprises at least one current block or advantageously a plurality of current blocks, can then be reconstructed from the reconstructed current block (s). This reconstructed current frame can be stored in the frame buffer 207 for serving as reference frame for inter prediction of another frame of the video stream.

A mode selection unit 208 is provided in the video coder 200 for, similarly to FIG. 1, selecting whether an input block of the video coder 200 is to be processed by the intra prediction unit 209 or the inter prediction unit 210. The mode selection unit 208 correspondingly chooses if a block of a frame is to be intra coded using only information from this frame, or is to be inter coded using additional information from other frames i.e. from at least one reference frame stored in the frame buffer 207.

The intra prediction unit 209 is responsible for the intra prediction and generates a prediction block based on intra prediction. As mentioned above, the inter prediction unit 210 is responsible for the inter prediction and generates a prediction block that is predicted from a block of the same size in a reference frame, so as to reduce the temporal redundancy.

Particularly, the sharpening filter 211 can be always enabled. This means that the prediction block generated by the inter prediction unit 210 is always fed to the sharpening filter 211, and that the residual block is always obtained by the difference of the current block and the sharpened prediction block that is outputted by the sharpening filter 211.

Alternatively, the sharpening filter 211 can be applied or bypassed. In case the sharpening filter 211 is applied, the sharpening filter 211 generates a sharpened prediction block and the residual block is obtained by the difference of the current block and the sharpened prediction block that is outputted by the sharpening filter 211. In case the sharpening filter 211 is bypassed, the residual block is obtained by the difference of the current block and the prediction block that is outputted by the inter prediction unit 210.

At least one of a selective application and bypassing of the sharpening filter 211 is controlled by a control unit 212. The control unit may be, for example, adapted to control the at least one application or bypassing of the sharpening filter 211 depending on a cost function to minimize the residual block. The cost function may be, for example, based on the rate distortion optimization. The cost function is particularly applied to the residual block obtained from the prediction block that is outputted by the sharpening filter 211, and to the residual blocks obtained from the prediction block that is outputted by the inter prediction unit 210. Depending on the result of the cost function, the sharpening filter 211 may be applied or bypassed.

The decision of the control unit 212 to bypass or apply the sharpening filter 211 can be transmitted as signaling data within the encoded video bit stream generated by the encoding unit or entropy encoding unit 203. The control unit 212 transmits a sharpening filter information to the encoding unit 203, said sharpening filter information reflecting at least one of the selective bypass or selective application of the sharpening filter 211. The encoding unit 203 then adds the sharpening filter information as signaling data in the encoded video bit stream.

The sharpening filter information can be in the form of a sharpening filter flag that can take two values, for example 0 and 1. One of these two values, for example 1, defines that the sharpening filter is applied, while the other value defines that the sharpening filter is bypassed. Alternatively, the absence of sharpening filter information can be interpreted as reflecting the bypassing of the sharpening filter, while the presence of sharpening filter information can reflect the application of the sharpening filter.

The granularity of the sharpening filter information can vary. The sharpening filter information can for example added at a block level for each prediction block, for an arbitrary or regular region of the frame, at a frame level, at a GOP (group of pictures) level, at a PPS (picture parameter set) level or at an SPS (sequence parameter set) level. If the sharpening filter information is added at a block level for each prediction block, the encoding unit 203 can add the sharpening filter information for each prediction block generated by the inter prediction unit 210. The encoding unit 203 then adds to the encoded video bit stream, for each prediction block, the corresponding quantized residual transform coefficients and the corresponding sharpening filter information.

Figures 3, 4:
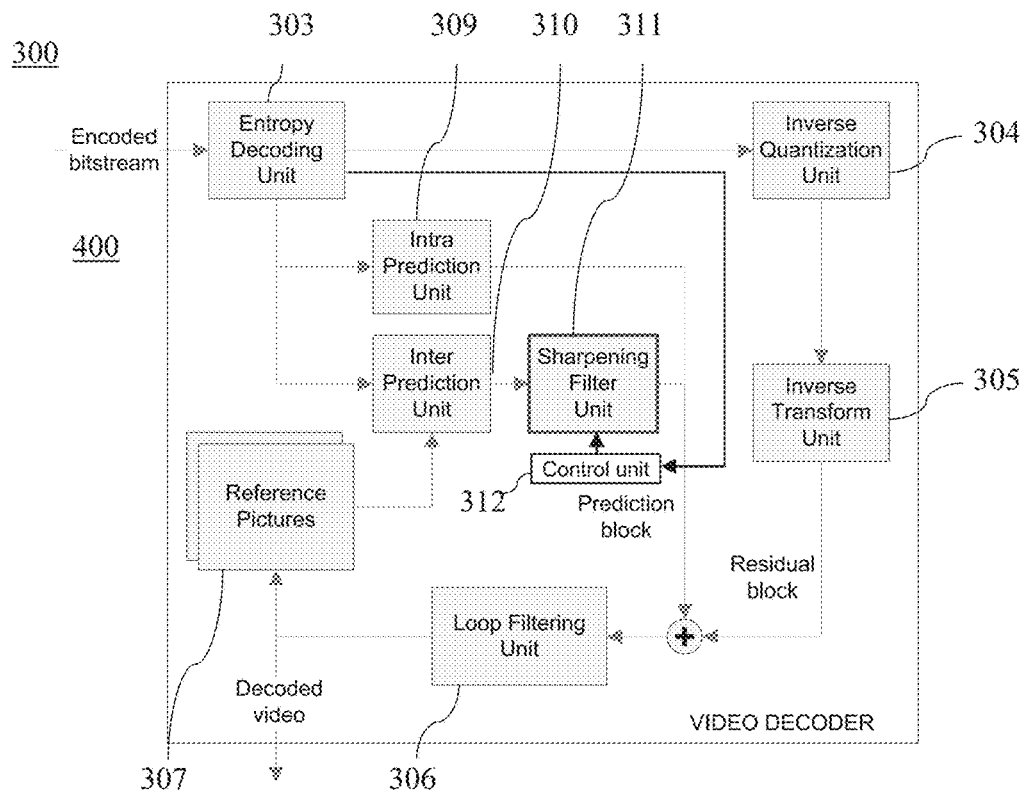
FIG. 3 shows a video decoder according to an embodiment of the present disclosure.
FIG. 4 shows an embodiment of a sharpening filter according to the present disclosure.

FIG. 3 shows a video decoder according to an embodiment of the present disclosure, and particularly a video decoder 300 for decoding an encoded video bit stream obtained by predictive coding a video stream of subsequent frames according to motion compensation.

The video decoder 300 comprises particularly a frame buffer 307, an inter prediction unit 310, and a sharpening filter 311. The frame buffer 307 is adapted to store at least one reference frame obtained from the encoded video bit stream, said reference frame being different from a current frame of the encoded video bit stream. The inter prediction unit 310 is adapted to generate a prediction block of a current block of the current frame from a reference block of the reference frame. The sharpening filter 311 is adapted to filter the prediction block.

The decoder 300 is adapted to decode the encoded video bit stream generated by the video coder 200, and both the decoder 300 and the coder 200 generate identical predictions. The features of the frame buffer 307, the inter prediction unit 310, and the sharpening filter 311 are similar to the features of the frame buffer 207, the inter prediction unit 210, and the sharpening filter 211 of FIG. 2.

Particularly, the video decoder 300 comprises further units that are also present in the video coder 200 like e.g. an inverse quantization unit 304, an inverse transform unit 305, a loop filtering unit 306 and an intra prediction unit 309, which respectively correspond to the inverse quantization unit 204, the inverse transform unit 205, the loop filtering unit 206 and the intra prediction unit 209 of the video coder 200. An entropy decoding unit 303 is adapted to decode the received encoded video bit stream and to correspondingly obtain quantized residual transform coefficients and, if present, sharpening filter information. The quantized residual transform coefficients are fed to the inverse quantization unit 304 and an inverse transform unit 305 to generate a residual block. The residual block is added to a prediction block and the addition is fed to the loop filtering unit 306 to obtain the decoded video. Frames of the decoded video can be stored in the frame buffer 307 and serve as a reference frame for inter prediction.

Particularly, the sharpening filter 311 can be always enabled. This means that the prediction unit filtered by the sharpening filter is used to obtain the decoded video.

Alternatively, the sharpening filter can be selectively applied or bypassed by, for example, a control unit 312. The sharpening filter information obtained by the decoding unit 303 from the encoded video bit stream can be fed to the control unit 312 that controls at least one of the selective bypass and the selective application of the sharpening filter 311 depending on the sharpening filter information.

The sharpening filter information reflects at least one of the selective bypass and the selective application of the sharpening filter 311 and preferably corresponds to the sharpening filter information added by the video coder 200 to the encoded video bit stream. The different aspects regarding for example the form and the granularity of the sharpening filter information discussed with respect to the video coder 200 also apply with respect to the video decoder 300.

FIG. 4 shows an embodiment of a sharpening filter 400 according to the present disclosure, and particularly an embodiment of the sharpening filter 211 of the video coder 200 or of the sharpening filter 311 of the video decoder 300. The video decoder 300 has preferably the same sharpening filter as the video coder 200 placed after the inter prediction unit 310.

The sharpening filter 400 is preferably a non-linear filter. The usage of a non-linear sharpening filter, instead of a linear filter, is preferable for removing artifacts caused by the motion interpolation filter and the quantization of the reference block or frame.

Particularly, the sharpening filter 400 comprises an edge map calculation unit 401, 402, a blurring filter 404, a high-pass filter 405, a scaling unit 406 and a warping unit 407.

The edge map calculation unit 401, 402 is adapted to generate an edge map of a source block, said source block being the reference block or the prediction block. The blurring filter 404 is adapted to blur the edge map of the source block. The high-pass filter 405 is adapted to generate, by high-pass filtering the blurred edge map, a derivative vector (d2x, d2y) for each position of the source block. The scaling unit 406 is adapted to generate a displacement vector (wx, wy) by scaling the derivative vector (d2x, d2y) with a sharpening strength coefficient k. The warping unit 407 is adapted to warp the prediction block based on the displacement vector (wx, wy).

The edge map calculation unit 401, 402 can comprise a gradient vector unit 401 adapted to generate a gradient vector (dx, dy) for each position of the source block, and a gradient vector length unit 402 adapted to calculate the length of the gradient vector (dx, dy) of each position so as to generate the edge map of the source block.

The gradient vector can be obtained by taking the first derivative separately for dx and dy, i.e. separately for both a horizontal and a vertical direction of the source block referred to as source block in FIG. 4, by applying a corresponding Prewitt filter in accordance with the following equations:

$$dx = \begin{bmatrix} 1 & 0 & -1 \\ 1 & 0 & -1 \\ 1 & 0 & -1 \end{bmatrix} * img$$

$$dy = \begin{bmatrix} 1 & 1 & 1 \\ 0 & 0 & 0 \\ -1 & -1 & -1 \end{bmatrix} * img$$

The edge map can be obtained by the gradient vector length unit 402 by calculating the gradient vector length in accordance with the following equation:

$$abs = \sqrt{dx^2 + dy^2}$$

Advantageously, the sharpening filter 400 comprises a clipping unit 403 adapted to clip the edge map of the source block, said clipping unit 403 being located between the edge map calculation unit 401, 402 and the blurring filter 404. Clipping the edge map with thresholds can prevent the processing of extremely high and low values of warping vectors.

The step of blurring of the clipped edge map can be obtained by a blurring filter 404 in form of a Gaussian filter that can be defined as follows:

$$G = \begin{bmatrix} 1 & 4 & 7 & 4 & 1 \\ 4 & 16 & 26 & 16 & 4 \\ 7 & 26 & 41 & 26 & 7 \\ 4 & 16 & 26 & 16 & 4 \\ 1 & 4 & 7 & 4 & 1 \end{bmatrix}$$

The high-pass filter is used to obtain, separately for d2x and d2y, the second derivative, for example according to the followings:

$$d^2x = [1 \ 0 \ -1]$$

$$d^2y = \begin{bmatrix} 1 \\ 0 \\ -1 \end{bmatrix}$$

The displacement vector (wx,wy) is obtained by scaling the second derivative vector (d2x, d2y) with the coefficient k, wherein the coefficient k can be considered as sharpening strength, according to the following equations:

$$wx=k*d^2x$$

$$wy=k*d^2y$$

The warping unit 407 includes an interpolation filter that is e.g. a bi-linear interpolation filter to obtain sample values at fractional-pel positions. The warping unit 407 uses the displacement vector generated by the scaling unit 406.

The sharpening filter 400 comprises a warping based on a displacement vector calculated from the source block, which source block is referred to in FIG. 4 as source image. According to an embodiment, the source block is the reference block of the reference frame stored in the frame buffer 207, 307, such that the displacement vector (wx, wy) is derived from the reference block. According to an alternative embodiment the source block is the prediction block generated by the inter prediction unit 210, 310, such that the displacement vector (wx, wy) is derived from the prediction block.

Figure 5:
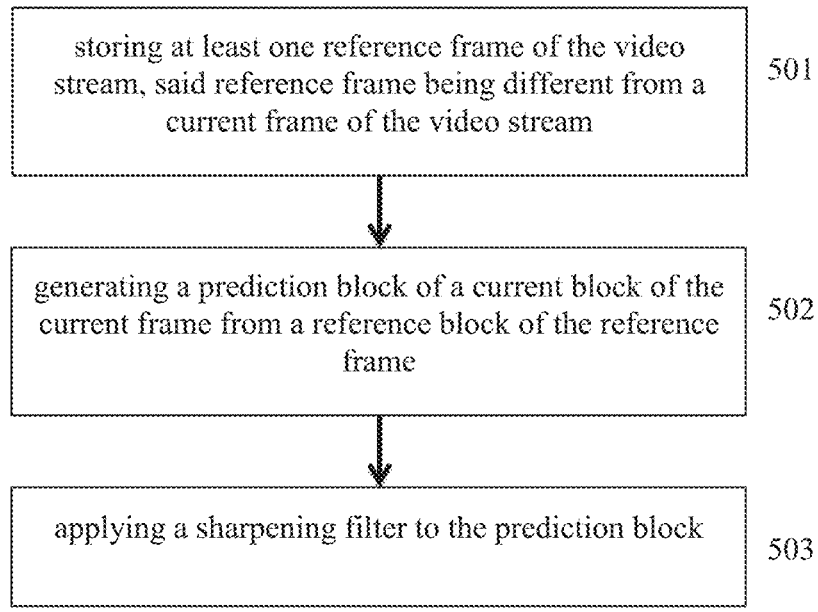
FIG. 5 shows a video coding method according to an embodiment of the present disclosure.

FIG. 5 shows a video coding method according to an embodiment of the present disclosure, and particularly a method 500 for predictive coding a video stream of subsequent frames according to motion compensation into an encoded video bit stream.

The method 500 comprises a step 501 of storing at least one reference frame of the video stream, said reference frame being different from a current frame of the video stream.

The method 500 further on comprises an inter prediction step 502 comprising generating a prediction block of a current block of the current frame from a reference block of the reference frame.

The method 500 further on comprises a sharpening filter step 503 comprising applying a sharpening filter to the prediction block, thereby filtering the prediction block.

Figure 6:
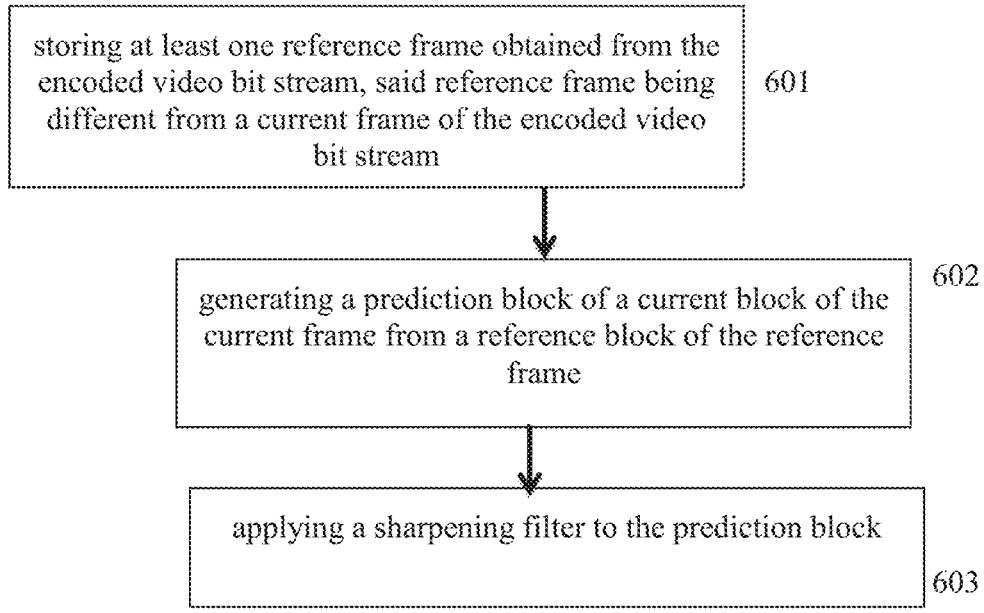
FIG. 6 shows a video decoding method according to an embodiment of the present disclosure.

FIG. 6 shows a video decoding method according to an embodiment of the present disclosure, and particularly a method 600 for decoding an encoded video bit stream obtained by predictive coding a video stream of subsequent frames according to motion compensation.

The method 600 comprises a step 601 of storing at least one reference frame obtained from the encoded video bit stream, said reference frame being different from a current frame of the encoded video bit stream.

The method 600 comprises an inter prediction step 602 comprising generating a prediction block of a current block of the current frame from a reference block of the reference frame.

The method 600 comprises a sharpening filter step 603 comprising applying a sharpening filter to the prediction block, thereby filtering the prediction block.

Further aspects and features described with respect to the video coder 200 or the video decoder 300 are also applicable to the coding method 500 and the decoding method 600.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfil the functions of several entities or items recited in the claims. The mere fact that certain measures are recited in the mutual different dependent claims does not indicate that a combination of these measures cannot be used in an advantageous implementation.

What is claimed is:

1. A video coder for predictive coding a video stream of subsequent frames according to motion compensation into an encoded video bit stream, the video coder comprising:
   a frame buffer adapted to store at least one reference frame of the video stream, the at least one reference frame being different from a current frame of the video stream,
   an inter predictor adapted to generate a prediction block of a current block of the current frame from a reference block of the reference frame,
   a sharpening filter adapted to filter the prediction block, and
   a controller adapted to control at least one of a selective bypass of the sharpening filter and a selective application of the sharpening filter,
   wherein the sharpening filter comprises:
      an edge map calculator adapted to generate an edge map of a source block, the source block being the reference block or the prediction block,
      a blurring filter adapted to blur the edge map of the source block,
      a high-pass filter adapted to generate, by high-pass filtering the blurred edge map, a derivative vector for each position of the source block,
      a scaling component adapted to generate a displacement vector by scaling the derivative vector with a sharpening strength coefficient, and
      a warping component adapted to warp the prediction block based on the displacement vector, and
   wherein the source block is the reference block, such that the displacement vector is derived from the reference block.

2. The video coder according to claim 1, wherein the sharpening filter is a non-linear filter.

3. The video coder according to claim 1, wherein the edge map calculator comprises:
   a gradient vector component adapted to generate a gradient vector for each position of the source block, and
   a gradient vector length component adapted to calculate a length of the gradient vector of each position so as to generate the edge map of the source block.

4. The video coder according to claim 3, wherein the gradient vector component is a Prewitt filter.

5. The video coder according to claim 1, wherein the sharpening filter comprises a clipping component adapted to clip the edge map of the source block, the clipping component being located between the edge map calculator and the blurring filter.

6. The video coder according to claim 1, wherein the blurring filter is a Gaussian filter.

7. The video coder according to claim 1, wherein the warping component includes a bi-linear interpolation filter to obtain sample values at fractional positions.

8. The video coder according to claim 1, wherein the sharpening filter is constantly enabled.

9. The video coder according to claim 1, wherein the controller is adapted to control the at least one of the selective bypass and the selective application of the sharpening filter depending on a cost function to minimize a residual block, wherein the residual block is the difference between the current block and the prediction block, and the cost function is based on the rate distortion optimization.

10. The video coder according to claim 1, comprising an encoder adapted to generate the encoded video bit stream,
wherein the controller is adapted to transmit to the encoder sharpening filter information reflecting the at least one of the selective bypass and the selective application of the sharpening filter, and
the encoder is adapted to add the sharpening filter information in the encoded video bit stream.

11. The video coder according to claim 10, wherein the sharpening filter information is added at a block level for each prediction block, for an arbitrary or regular region of the frame, at a frame level, at a group of pictures (GOP) level, at a picture parameter set (PPS) level or at a sequence parameter set (SPS) level.

12. A method for predictive coding a video stream of subsequent frames according to motion compensation into an encoded video bit stream, the method comprising:
storing at least one reference frame of the video stream, wherein the at least one reference frame is different from a current frame of the video stream,
generating a prediction block of a current block of the current frame from a reference block of the reference frame, and
selectively applying a sharpening filter to the prediction block,
wherein the sharpening filter comprises:
an edge map calculator adapted to generate an edge map of a source block, the source block being the reference block or the prediction block,
a blurring filter adapted to blur the edge map of the source block,
a high-pass filter adapted to generate, by high-pass filtering the blurred edge map, a derivative vector for each position of the source block,
a scaling component adapted to generate a displacement vector by scaling the derivative vector with a sharpening strength coefficient, and
a warping component adapted to warp the prediction block based on the displacement vector, and
wherein the source block is the reference block, such that the displacement vector is derived from the reference block.

13. A video decoder for decoding an encoded video bit stream obtained by predictive coding a video stream of subsequent frames according to motion compensation, the video decoder comprising:
a frame buffer adapted to store at least one reference frame obtained from the encoded video bit stream, the at least one reference frame being different from a current frame of the encoded video bit stream,
an inter predictor adapted to generate a prediction block of a current block of the current frame from a reference block of the reference frame,
a sharpening filter adapted to filter the prediction block, and
a controller adapted to control at least one of a selective bypass of the sharpening filter and a selective application of the sharpening filter,
wherein the sharpening filter comprises:
an edge map calculator adapted to generate an edge map of a source block, the source block being the reference block or the prediction block,
a blurring filter adapted to blur the edge map of the source block,
a high-pass filter adapted to generate, by high-pass filtering the blurred edge map, a derivative vector for each position of the source block,
a scaling component adapted to generate a displacement vector by scaling the derivative vector with a sharpening strength coefficient, and
a warping component adapted to warp the prediction block based on the displacement vector, and
wherein the source block is the reference block, such that the displacement vector is derived from the reference block.

14. The video decoder according to claim 13, wherein the sharpening filter is constantly enabled.

15. The video decoder according to claim 13, wherein the controller is adapted to control the at least one of the selective bypass and the selective application of the sharpening filter depending on sharpening filter information obtained from the encoded video bit stream.

16. A method for decoding an encoded video bit stream obtained by predictive coding a video stream of subsequent frames according to motion compensation, the method comprising:
storing at least one reference frame obtained from the encoded video bit stream, the at least one reference frame being different from a current frame of the encoded video bit stream,
generating a prediction block of a current block of the current frame from a reference block of the reference frame, and
selectively applying a sharpening filter to the prediction block,
wherein the sharpening filter comprises:
an edge map calculator adapted to generate an edge map of a source block, the source block being the reference block or the prediction block,
a blurring filter adapted to blur the edge map of the source block,
a high-pass filter adapted to generate, by high-pass filtering the blurred edge map, a derivative vector for each position of the source block,
a scaling component adapted to generate a displacement vector by scaling the derivative vector with a sharpening strength coefficient, and
a warping component adapted to warp the prediction block based on the displacement vector, and
wherein the source block is the reference block, such that the displacement vector is derived from the reference block.

17. A non-transitory computer readable storage medium for storing processor-executable instructions for decoding an encoded video bit stream obtained by predictive coding a video stream of subsequent frames according to motion compensation, when the processor-executable instructions are executed by a hardware processor of a computer device they cause the processor to perform steps comprising:

storing at least one reference frame obtained from the encoded video bit stream, the at least one reference frame being different from a current frame of the encoded video bit stream, generating a prediction block of a current block of the current frame from a reference block of the reference frame, and selectively applying a sharpening filter to the prediction block, wherein the sharpening filter comprises:
- an edge map calculator adapted to generate an edge map of a source block, the source block being the reference block or the prediction block,
- a blurring filter adapted to blur the edge map of the source block,
- a high-pass filter adapted to generate, by high-pass filtering the blurred edge map, a derivative vector for each position of the source block,
- a scaling component adapted to generate a displacement vector by scaling the derivative vector with a sharpening strength coefficient, and
- a warping component adapted to warp the prediction block based on the displacement vector, and wherein the source block is the reference block, such that the displacement vector is derived from the reference block.

* * * * *